Aug. 29, 1961   A. L. MOORE ET AL   2,998,141
TRANSFER DEVICE FOR SHEET MATERIALS
Filed Jan. 25, 1960   4 Sheets-Sheet 1
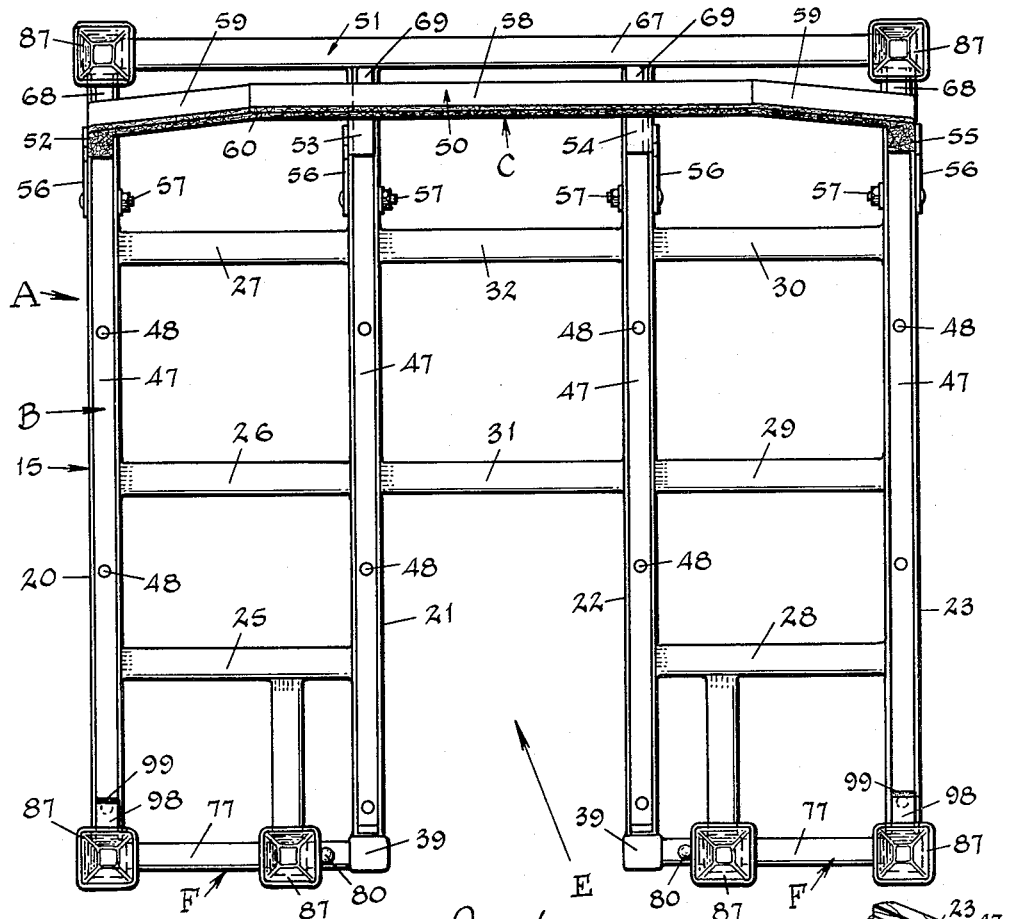
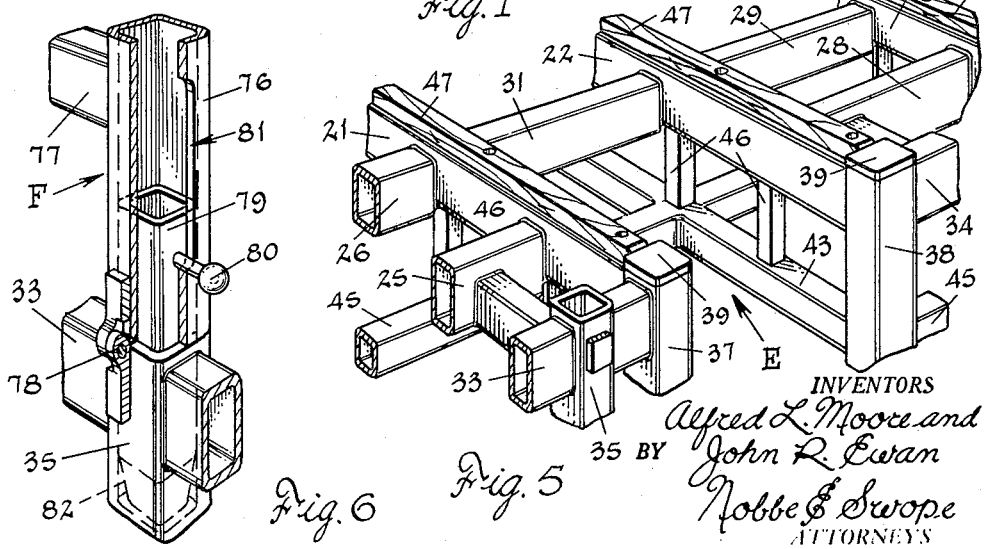
INVENTORS
Alfred L. Moore and
John R. Ewan
BY Nobbe & Swope
ATTORNEYS

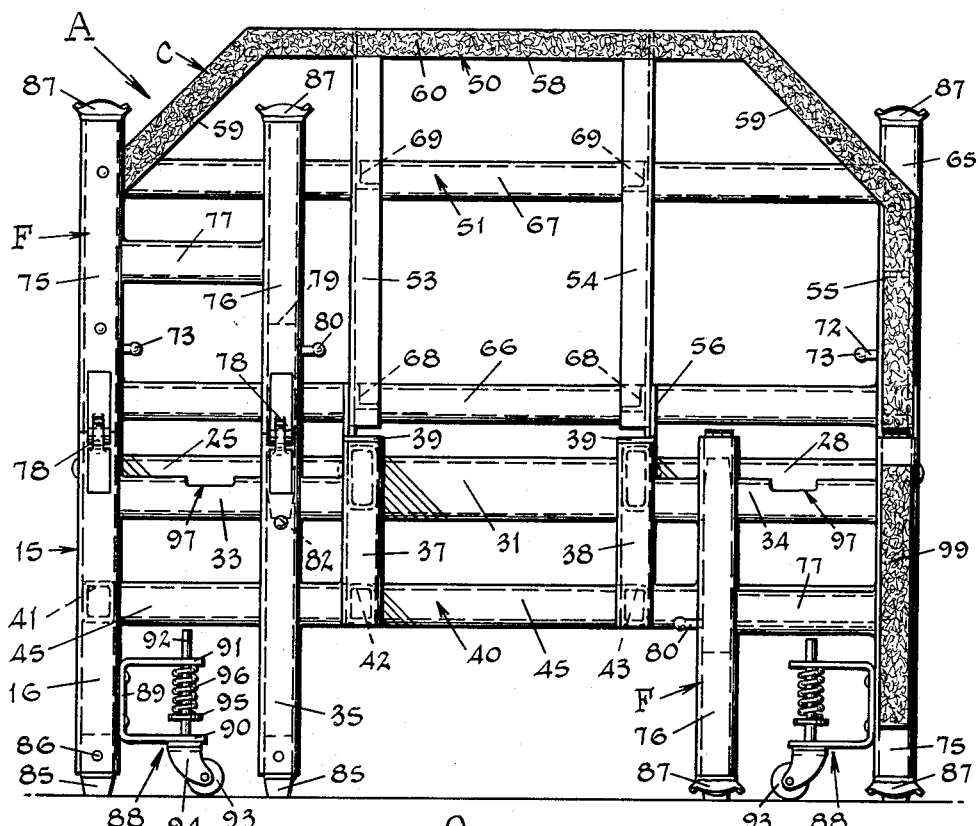
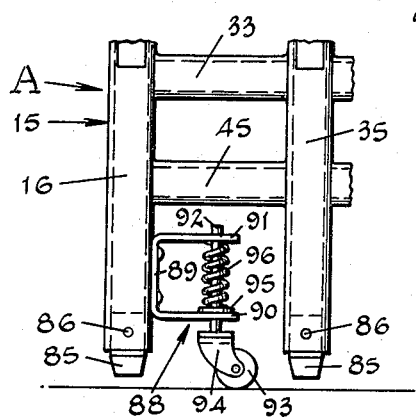
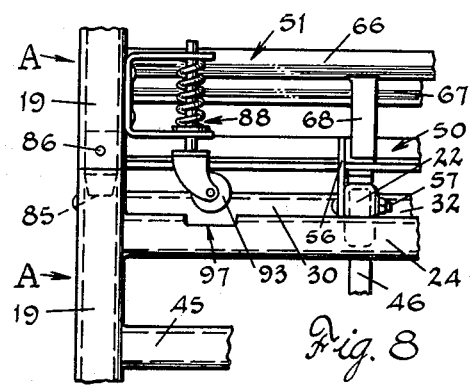

Aug. 29, 1961     A. L. MOORE ET AL     2,998,141
TRANSFER DEVICE FOR SHEET MATERIALS
Filed Jan. 25, 1960     4 Sheets-Sheet 3
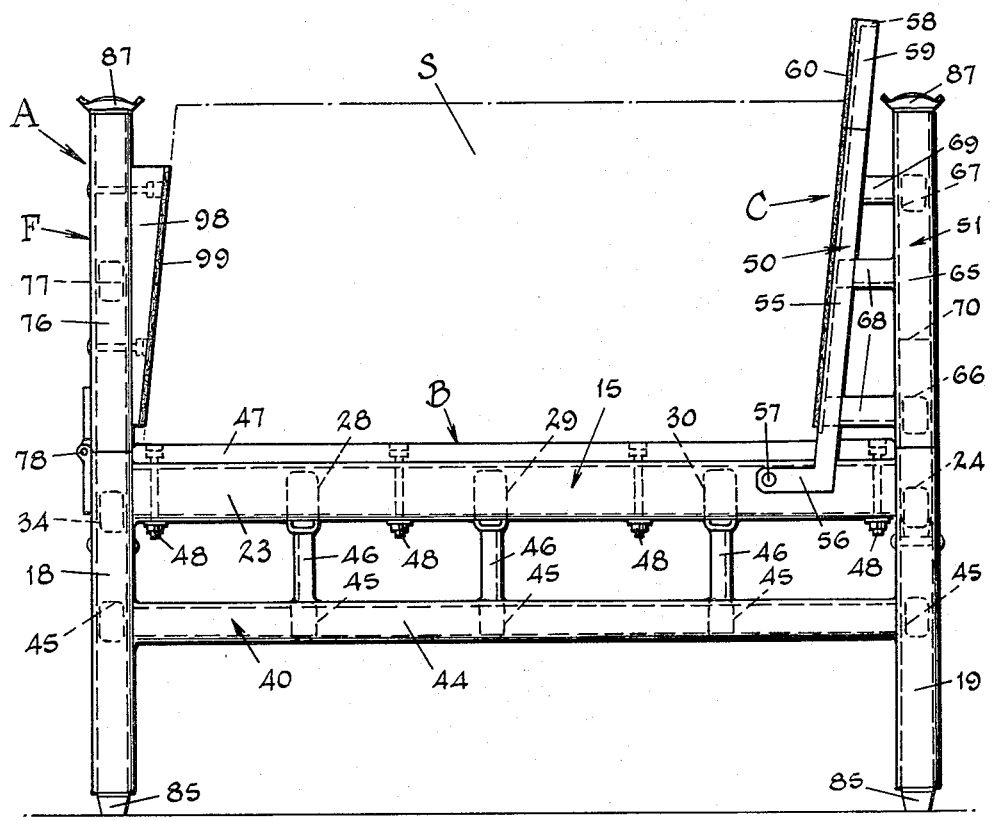
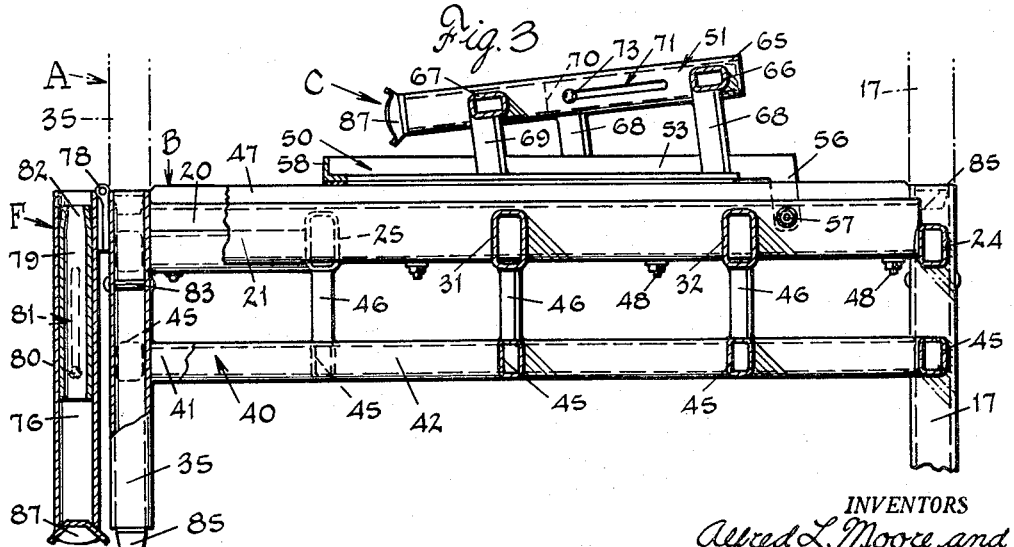
INVENTORS
Alfred L. Moore and
BY John R. Ewan
Nobbe & Swope
ATTORNEYS

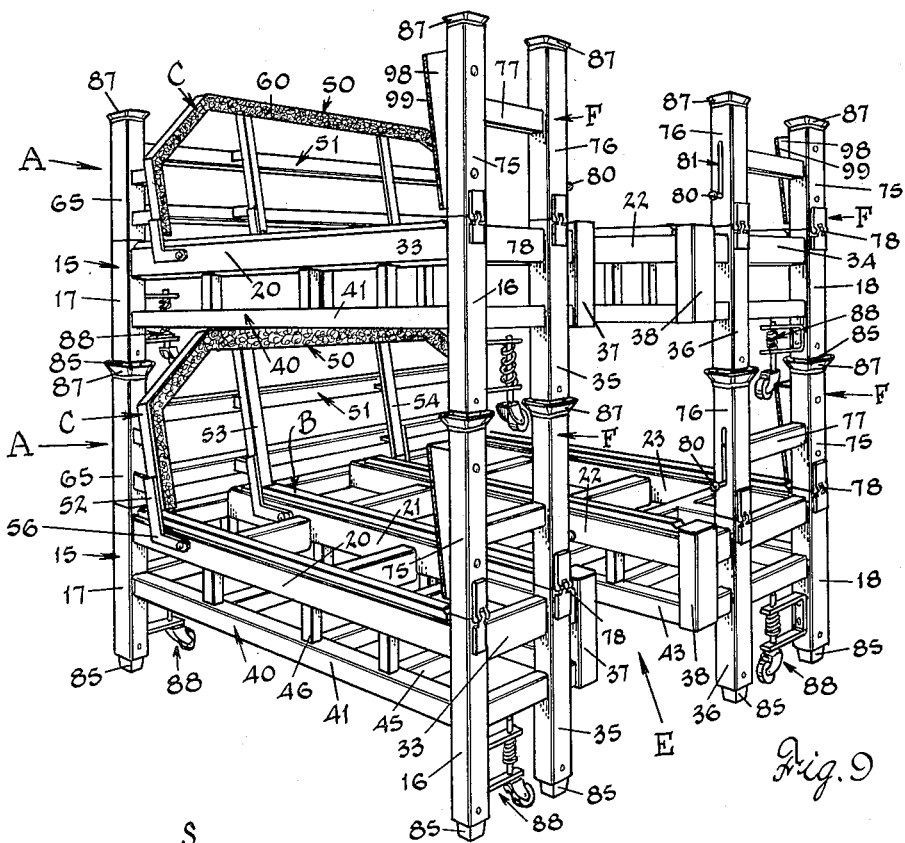
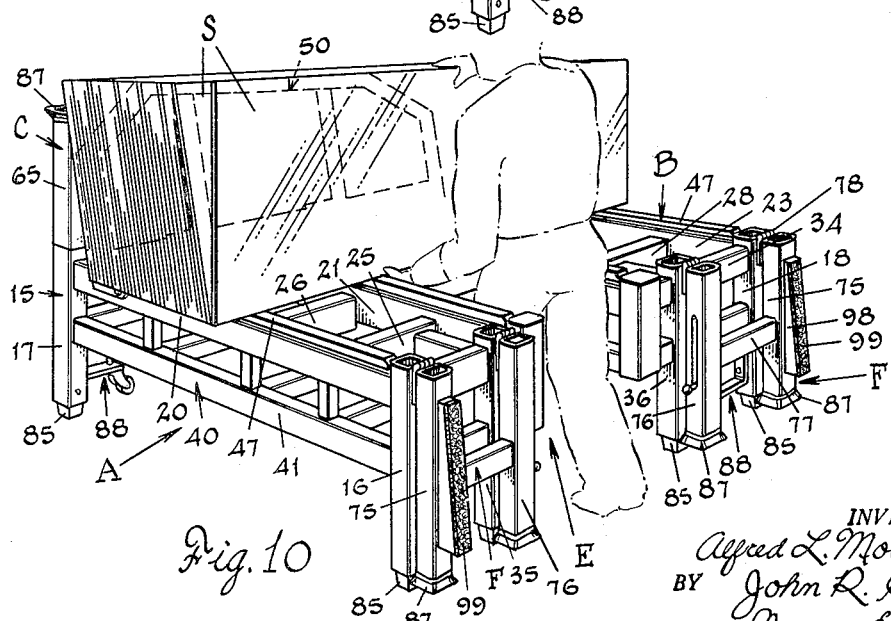

United States Patent Office 2,998,141
Patented Aug. 29, 1961

2,998,141
TRANSFER DEVICE FOR SHEET MATERIALS
Alfred L. Moore, Maumee, and John R. Ewan, Toledo, Ohio, assignors to Libbey-Owens-Ford Glass Company, Toledo, Ohio, a corporation of Ohio
Filed Jan. 25, 1960, Ser. No. 4,475
10 Claims. (Cl. 211—41)

The present invention relates broadly to conveying equipment for sheet materials such as glass or the like and more particularly has to do with an improved transfer device that is designed to enable easier loading and removal of such materials and which can also be readily altered structurally to facilitate the conveying or storage thereof when not in actual use.

It is an important object of this invention to provide a transfer device which is adapted to carry a relatively large number of glass sheets and is constructed with a substantially U-shaped floor to enable the rapid loading or removal thereof. The device may thus be employed to great advantage in the transporting of sheets of relatively large dimension from one area of processing to a second area for subsequently occurring operations and whereby one operator may safely place or remove successive sheets without undue straining as the supply of sheets increases from or diminishes toward one end of the transfer device.

Another object of the invention is to provide a transfer device of the above character having a U-shaped floor upon which a plurality of sheets can be safely and conveniently arranged and transported. Due to the novel features of its construction, the device is adapted to support a relatively large number of sheets across the full area of the floor and between the respective ends thereof.

A further object of the invention is to provide, in a transfer device of the above character, means for rigidly stacking one device fully loaded with sheet materials and with respect to a second transfer device to thereby enable the safe transporting of an increased number of sheets during a single transfer operation.

A still further object of the invention is to provide a transfer device which is adapted to be arranged in vertically stacked relation with other devices of the same character when loaded or unloaded, thereby permitting them to be transported and/or stored in rigid relation to one another.

Other objects and advantages of the invention will become more apparent during the course of the following description, when read in connection with the accompanying drawings.

In the drawings wherein like numerals are employed to designate like parts throughout the same:

FIG. 1 is a plan view of a transfer device constructed in accordance with the invention;

FIG. 2 is a front elevation of the transfer device;

FIG. 3 is a side elevation of the transfer device with the end frames in their uppermost positions;

FIG. 4 is a similar side elevational view of a transfer device, portions thereof being in cross-section, with the end frames arranged in their lowermost positions to permit stacking of one device upon another;

FIG. 5 is a fragmentary perspective view of the entry area in the forward end of the transfer device;

FIG. 6 is a fragmentary perspective view of a locking member for supporting the end frames in their uppermost position;

FIG. 7 is a view of a corner of the transfer device and a caster member for conveniently moving the same;

FIG. 8 is a fragmentary view of the rear corner of two transfer devices when the same are stacked as illustrated in FIG. 4;

FIG. 9 is a perspective view of two transfer devices in stacked relation and with the end frames thereof in the uppermost position; and FIG. 10 is a perspective view of a transfer device with the forward end frames in their lowermost positions.

Referring now more particularly to the drawings, there is disclosed in FIGS. 1, 2 and 3, a transfer device constructed in accordance with this invention and designated in its entirety by the letter A. The transfer device, which hereinafter may also be referred to as a "buck" since that is the term commonly applied to such devices for transporting sheet materials, is provided with a deck or floor B having an upper surface adapted to support the sheets, such as sheets or blanks of glass, or the like, without damage to the lower edges thereof. At one or the rear end of the device, a movable section C is mounted in a vertically inclined position to receive the surface of a sheet of material thereagainst and for this purpose is provided on its inwardly directed surface with a felt material which will not scratch or otherwise mar the material's surface. At the front end of the transfer device, an entry way or aisle E is provided in the central area thereof and on each side of this opening movable sections F are mounted to engage the surface of a sheet of material and thereby confine a plurality of sheets on the transfer device when the same has been fully loaded. As will be more fully hereinafter described, the purpose of the entry way E is to enable ready access to an aisle or passageway G extending longitudinally of the device to substantially the center thereof. The aisle or passageway E makes it possible for one operator to easily handle a sheet of material in loading or removing the same and to thus approach the rear end of the device and gradually "work" toward the front end thereof without the inconvenience of stretching or placing himself physically off-balance to load or remove sheets of material. This materially reduces the labor factor since at least two operators have heretofore been ordinarily required to pick up the sheets of glass by their ends and from along the sides of a transfer device.

As viewed in FIGS. 3 and 9, the movable sections C and F are arranged in substantially rigid positions with respect to the floor B to support a plurality of glass sheets S during the transporting or storage thereof. Also, as viewed in FIG. 9, when a number of transfer devices are loaded with sheet materials or empty, they are adapted to be stacked one upon another. In fact, in actual practice, the novel structure of the transfer devices enables at least three devices or bucks to be located in such relation during the storage thereof. On the other hand, during loading or unloading of the sheet material, and as illustrated in FIG. 10, the movable sections F are swung downwardly thereby enabling free, unobstructed access to the entire area of the floor B. This permits entry of an operator from the forward end of the transfer buck along the aisle E toward the central area thereof.

To reduce the actual height of the transfer device thereby enabling a considerable number to be stacked one upon another, the movable section C can be swung forwardly and downwardly to an inactive position as in FIG. 4. This will materially increase the number of devices that can be stored since two devices can be arranged one on the other in the same vertical area as that occupied by a single device with the movable sections raised to their sheet supporting positions.

Essentially, the transfer device A comprises a substantially rectangular frame or body 15 that is supported at the corners thereof by tubular posts or legs 16, 17, 18 and 19. The floor B which is carried by the frame 15 is formed by horizontally disposed structural members 20, 21, 22 and 23 that are arranged in spaced parallel relation and longitudinally within the frame. The members 20 and 23 are disposed between and rigidly secured, as by welding, to the legs 16—17 and 18—19 respectively and accordingly constitute the side rails of the frame 15. The legs 17 and 19 are structurally joined by a transverse horizontally disposed brace member 24 forming an end rail of the frame. The proximate ends of the structural members 21 and 22 (FIG. 8) are connected to the brace member 24.

To reinforce the structural relation of the floor members, suitable brace members are arranged transversely therebetween so as to interjoin the members 20 and 21 and 22 and 23 into integral pairs. Thus, bracing members 25, 26 and 27 are arranged transversely in spaced parallel relation between the structural floor members 20 and 21, while similar bracing members 28, 29 and 30 are provided between the pair of members 22 and 23. In this arrangement, the braces 25 and 28, the braces 26 and 29 and braces 27 and 30 are substantially aligned with one another. Since the entry way or aisle E is provided in the end of the frame opposite the brace member 24, additional bracing members 31 and 32 are joined to the floor members 21 and 22 in alignment with the braces 26—29 and 27—30. This, as shown in FIG. 1, forms the aisle or "walk-in" area E from substantially the center of the frame 15 to the ends of the members 21 and 22 terminating in the plane of the legs 16 and 18 connected to the like ends of the members 20 and 23 at the front of the buck. The ends of the structural floor members 20—21 and 22—23 are joined by braces 33 and 34; however, according to the embodiments of this invention, a second tubular post or leg 35 and 36 is interposed in the brace members 33 and 34 respectively and the ends of floor members 21 and 22 are secured to a corner post 37 and 38 as the case may be. Since the unattached portions of the floor members 21 and 22 between the braces 31 and 33—34 act substantially as side rails of the walk-in area G, the posts 37 and 38 might be described as "newels" to distinguish the same from the vertically disposed posts or legs 16 to 19 and 35 and 36 by which the frame 15 bodily is supported on the floor of a building. The upper ends of the posts 37 and 38 are preferably closed by cap plates 39 (FIG. 5) which are suitably finished around their edges to produce a rounded surface.

To further reinforce the frame 15, a plurality of structural members are arranged beneath and in parallel relation with the above-described floor members and bracing members to form a framework 40 therefor. Thus, as viewed in FIGS. 2, 3 and 4, complementary longitudinally disposed braces 41, 42, 43 and 44 are arranged beneath the floor members 20 to 23. Likewise, similar but transversely disposed braces 45 are provided therebetween and beneath the brace members 24 to 34 inclusive. Further rigidity is obtained by locating vertical struts 46 at the points of intersection of the braces 41 to 45 and the like points of the members 20 to 23 thereabove.

Upon further reference to FIGS. 2 and 3, it will be noted that the lower surfaces of the floor members 20 to 23 are all in a substantially horizontal plane with reference to one another whereby the forks of a lift-truck can be directed transversely through the frame 15 to raise the transfer device A bodily upon engagement of the lower surfaces of the floor members 20—23 in contact with the upper surfaces of the forks. Similarly the related lower surfaces of the brace members comprising the framework 40 may be utilized for lifting a transfer device. In other words, the forks of a truck may be introduced at either end of the device and below either the lower surfaces of the bracing members 25 to 34 inclusive or the transversely disposed members 45 of the framework 40. The adaptability of the transfer device to be raised at two levels of engagement by a lift-truck thus enables it to be satisfactorily balanced and transported from one area to another whether loaded with sheets of glass or with one device stacked upon another.

The actual surface of the floor B of the transfer device A is formed by wood rails or slats 47 that are fixedly mounted on the upper surfaces of the floor members 20, 21, 22 and 23 by means of bolts. 48. While in some instances the use of felt or like material on the wood rails may be found preferable, it has in actual practice been determined that sheet materials, such as glass, can be placed on edge on the wood rails without damage.

The movable section C, which has heretofore been described as mounted adjacent the rear end of the frame 15, is adapted to be maintained in the raised or operative position as shown in FIG. 3 or moved to a lowered or inactive position as viewed in FIG. 4. The section C is generally formed by a support wall 50 and an end wall 51. The support wall 50 is adapted to be located inwardly from the adjoining end of the frame and in vertically inclined relation to the floor B of the transfer device to sustain the weight of the plurality of sheets of glass as they are placed thereagainst. More particularly, the support wall is formed of structurally angular stock and has a plurality of legs 52, 53, 54 and 55 arranged in parallel relation and spaced in general alignment with the structural floor members 20 to 23. The lower end of each leg is provided with an L-shaped arm 56; one section of which is pivotally mounted on an adjacent floor member by a bolt 57. The outermost legs 52 and 55 and a central horizontally disposed section 58 of the wall 50 are substantially interjoined by outwardly and angularly bent sections 59. These sections are formed by suitably bending a length of angle iron to the required outline. The legs 53 and 54 are secured to the central section 58 at their upper ends. The inwardly facing surface of the wall 50 is covered with a suitable padding material, such as the layer of felt 60, to prevent scratching or otherwise marring the surface of a glass sheet when the same is placed thereagainst.

The end wall 51 is rigidly connected to the structure of the support wall 50 and serves to maintain the same in its raised, operative position by the provision of locking members, which are more fully described hereinafter, to restrain the end wall from motion relative to the frame 15. This wall is formed by vertically disposed tubular end posts 65 and transverse, horizontally disposed brace members 66 and 67. The end posts 65 are vertically aligned with the legs 17 and 19 of the frame 15 so that in raised position they form an upwardly directed extension thereof. By means of horizontally disposed strut members 68, the legs 52—55 of the support wall are connected to the end posts 65 and the brace member 66 while by similar struts 69, the legs 53 and 54 are integrally joined to the brace member 67.

The inter-related support wall 50 and end wall 51 may thus be pivoted as a unit about the bolts 57 from the raised position of FIG. 3 to the lowered position as in FIG. 4, or vice versa. However, to sustain these walls in their raised position, the end posts 65 are provided with tubular lock members 70 telescopically interfitting with the inner surfaces thereof. As best seen in FIG. 4, the inwardly directed wall of each end post is formed with a slot 71 in which is received the shank 72 of an operating handle 73. The shank 72 is connected at its inner end into the walls of the locking member 70 telescopically received within the end post 65. With the end wall positioned as shown in FIG. 3, the end posts 65 are vertically aligned with the legs 17 and 19 and the lock members are slidably movable from the lower ends of the end posts into the upper ends of the legs until the shanks 72 engage one or the lower end of their respective slots 71. However, when the movable section C is to be moved to its inactive position, the handles 73 are employed to move the shanks toward the opposite ends of the slots thereby withdrawing the locking members from posts 17—19 and into the end posts 65. The locking device for the movable section C is identical to the devices for securing the movable sections F and which are fully described hereinafter and clearly illustrated in FIG. 6.

The movable sections F which, as heretofore mentioned, in raised position firmly engage the outermost one of a plurality of loaded sheets, are movable into a lowered or inactive position in which they do not obstruct the loading or removal of the sheet material and also permit ready stacking of a number of transfer devices or bucks. As best seen in FIG. 2, each section F includes tubular posts 75 and 76 and an integral cross-member 77. Each section is mounted for swinging movement by means of hinges 78 secured to the upper ends of the respective frame legs 16—35 and 18—36.

As viewed in FIG. 6, the tubular post 76 is equipped with an interfitting locking member 79 having a handle 80 operatively movable within the limits of a slot 81 provided in a wall of the post. Locking of each section F in the raised position is accomplished by moving the member 79 downwardly so that substantially half of its length is telescopically engaged with the upper end of the respective leg post 35 or 36 with which a post 76 is vertically aligned. To facilitate entry of the member 79 into a leg post 35—36, the entering or lower end thereof is provided with a frusto-conical or tapered portion 82. The tapered surfaces 82 guide the locking member 79 into the open end of the associated leg 35—36 and align the posts 76 with a leg 35—36 for unrestricted sliding movement of the member 79 until it engages a stop pin 83.

The lower extremities of each leg post of the transfer device and the upper ends of the movable sections are equipped with especially formed members that are adapted to readily interfit and thereby effect a rigidly supported relation between several transfer devices when the same are arranged in the stacked relation of FIGS. 4 and 9. For this purpose, the lower end of each leg post 16 to 19 and 35 and 36 is provided with a tapered, four-sided foot 85 that is secured therein by a pin 86. The foot 85 is adapted to interfit with or nest in a four-sided socket or cup-shaped member 87 that is secured to the upper end of each post 65 of the movable section C as well as the upper ends of the posts 75 and 76 of the sections F. As shown in FIG. 9, the surfaces of the feet 85 of the upper buck A nest with the complementary surfaces of the cup-shaped members 87 of the lower transfer buck A; however, when the movable sections C and F are located in their lower positions as in FIG. 4, the feet 85 of an upper buck, indicated in broken line, are equally well adapted, by reason of their convergently disposed surfaces, to enter and be received in the open, upper ends of the tubular leg posts 16, 17, 18, 19, 35 and 36 of a lower buck.

The transfer device A is also adapted to be easily moved by a single operator without the aid of a lift-truck when sheet materials have been unloaded therefrom or an empty device is to be shifted from one area to another. For this purpose, the frame 15 is provided with a caster-wheel arrangement 88 at each of its corners. As seen in FIG. 2, the caster-wheel arrangement includes a mounting bracket 89 secured to each of the leg posts 16 to 19. The horizontally disposed arms 90 and 91 of the bracket slidably support a spring-loaded, vertically disposed spindle 92. The spindle at its lower end conventionally carries a caster wheel 93 by the housing 94. The spindle is provided with a washer 95 on which one end of a spring 96 is supported; the opposite end thereof being held against the arm 91. The expansion characteristic of each of the several springs 96, is such that collectively they will overcome the weight of a transfer device when the same is completely empty. Accordingly, when a transfer device is loaded or being unloaded, the combined weights of the device and the sheet material will overcome the downward thrust of the springs 96 so that the legs 16 to 19 and 35—36 will support the combined weight of the buck and its load on a floor surface as shown in FIG. 2. However, the lifting force exerted by the springs is sufficient to raise an empty transfer device so that it is supported on the casters 93 with the feet 85 of the device above the floor surface as in FIG. 7. Since the force of the springs would also be effective when the devices are to be stacked as in FIG. 4, the structural members 24, 33 and 34 are provided with notches as at 97 in FIGS. 2 and 8 to provide clearance for the casters. Thus, the member 24 at one end of the frame as well as the members 33 and 34 at the opposite end of the frame have suitably notched areas 97 to eliminate any possibility for a caster to rest upon the structure of a lower device with consequential lifting of an upper device as it is placed in stacked relation therewith.

In order to protect the outer surface of the last one of a plurality of sheets to be loaded on a transfer device from being scratched or otherwise marred, the post 75 of each section F is equipped with a wood block 98 having a padded surface, such as a felt layer 99. Usually the block is shaped as a wedge having an angularly disposed surface, covered by the felt layer 99, that is substantially parallel to the inclined surface of the oppositely disposed support wall 50 when both the movable sections C and F are in the raised position of FIG. 3.

In use, the movable section C is placed in its raised or active position with reference to the floor B of the transfer buck A by swinging the support wall 50 and attached end wall 51 thereof from the position shown in FIG. 4 to the position shown in FIGS. 3 and 9. At this time, the forward movable sections F may remain in their inactive or lowered positions. As the section C is swung upwardly, the handles 73 of the locking members 70 are held to restrain the members from falling from the lower open ends of the related tubular end posts 65. However, as the posts assume a substantially vertical position, in alignment with the corner legs 17 and 19, the locking members 70 are moved downwardly to the lower limit of the slot so that at least one half of the length of the locking member enters the upper open ends of the corner legs, thus establishing a substantially rigid relation between the frame 15 and the movable section C. Now, as illustrated in FIG. 10, the floor B is progressively loaded with sheets of material from rear to front by an operator who carries a sheet into the aisle E and places one edge of a first sheet on the wood rails 47 of the floor B and rests one surface against the felt covered surface of the support wall 50. As the transfer buck becomes fully loaded, entry of an operator into the aisle or "walk-in" area E lessens until a complete load, as shown in FIG. 3, has been obtained. Of course, after the first sheets are placed on the buck, their weight combined with the weight of the buck per se will rapidly overcome the force of the several springs 96 and the buck descends until it is firmly supported on the feet 85.

The movable sections F are now swung upwardly to the position of FIG. 3 where the felt material 99 covering the surface of the blocks 98 engages the surface of the last sheet to have been loaded. As each section F is moved to its uppermost position, the handle 80 of the associated lock member 79 is employed to hold the member up within the tubular post 76 until the same assumes a substantially vertical position. The lock member is then allowed to drop into the tubular leg 36 until the shank of the handle 80 reaches the lower end of the slot 81 in post 76 or the lower end of member 79 engages the stop pin 83. The transfer buck with the sections C and F in their raised or active positions will appear as shown in FIGS. 3 and 9. The buck may then be raised by a lift-truck and transported to another area in which the sheet material may be unloaded for processing or it may be removed to a storage area and placed in stacked relation with similar transfer devices.

Each device will support a minimum load of approximately four tons and further sustain the loaded weight of at least two additional transfer devices when arranged in stacked relation thereabove. When a number of the transfer bucks are to be stacked one upon another, they are raised sufficiently to enable the feet 85 to be vertically aligned with and then lowered into the cup-shaped members 87 of the buck therebeneath. To balance the weight of a fully loaded buck, the fork of a lift-truck is positioned to raise the same upon engagement with the undersurface of the floor B.

Preparatory to unloading a transfer buck, the movable sections F are swung downwardly to their lowermost positions. This is accomplished after lifting upwardly on the handles 80 to retract the locking members 79 from the associated leg post 35 or 36. An operator, as diagrammatically shown in FIG. 10, may then enter the "walk-in" area E as the number of sheets is reduced and gradually approach the sheets at the rear end of the buck without stretching or placing himself off-balance. Also, when the sheet is lifted to a plane only slightly above the surface of the floor B, the operator can move out of the area E without interference from the movable sections F. As previously mentioned, the facility with which a single operator can load or unload a transfer buck of this invention materially reduces the amount of labor otherwise required for these operations.

When a transfer device is empty and is to be transported, as for example, to an area for reloading or storage, the over-all height may be reduced by lowering the movable sections C and F to their inactive positions wherein the support wall 50 of section C is located in close relation to the surface of the floor B and the section F is in the position of FIG. 4. The locking members 70 are now withdrawn from the corner legs 17 and 19 whereupon the section can be swung forwardly about the axes of the several bolts 57. Likewise, the lock members 79 are withdrawn from the posts 35 and 36 and the sections F swung about the axes of hinges 78. When stacking a plurality of transfer bucks to transport a number at one time or for temporary storage, the undersurface of the framework 40 is engaged by the fork of a lift-truck and the buck raised and positioned over another buck until the feet 85 thereof are vertically aligned with the upper open ends of the leg posts of the lowermost buck. The manner of stacking is illustrated by the feet and legs of an upper buck, in broken line in FIG. 4, being located in alignment with the similar leg posts of the lower or first transfer device.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. A transfer device for sheet materials, comprising a substantially rectangular horizontal frame including a plurality of spaced, substantially parallel longitudinal members and a plurality of spaced, substantially parallel transverse members connecting said longitudinal members, one of said transverse members being spaced inwardly from one end of said longitudinal members to form a walk-in area, means for supporting said frame, means carried by said longitudinally extending members and constituting a floor upon which the sheet material is supported on edge, a support wall including an inclined section carried by the frame adjacent the end thereof remote from the walk-in area and against which the sheet material is received when the same is supported on edge upon the supporting floor, a pair of movable sections hingedly carried by the frame at the end thereof remote from said support wall and located at opposite sides of said walk-in area, said last-named sections being movable from a sheet retaining position to a non-retaining position, and means for securing said movable sections in sheet retaining position opposite said support wall.

2. A transfer device for sheet materials as claimed in claim 1, including means for pivotally mounting the support wall on the frame for movement from an upper sheet receiving position to a lowered position, and means for securing said support wall in said upper sheet receiving position.

3. A transfer device for sheet materials as claimed in claim 1, in which the frame supporting means includes a plurality of legs arranged at the corners thereof, in which the support wall is provided with end posts aligned with and supported upon the upper ends of certain of said legs when said support wall is in sheet receiving position, and in which means is provided for securing each post and respective leg together when said support wall is in sheet receiving position.

4. A transfer device for sheet materials as claimed in claim 3, in which said posts are tubular posts and said legs are tubular legs, and in which said securing means comprises a locking member slidably received in each tubular post and movable into locking relation in the respective tubular leg.

5. A transfer device for sheet materials as claimed in claim 1, in which the frame support means includes a plurality of legs arranged at the corners thereof, and additional legs located opposite the corner legs at the walk-in end of the frame, said pair of movable sections each comprising spaced posts connected to one another, one post of each section being aligned with and supported upon a corner leg and the second post of each section being aligned with and supported upon one of said additional legs when said section is in sheet retaining position.

6. A transfer device for sheet materials as claimed in claim 5, in which said additional legs are tubular legs and in which the second post of each section is a tubular post, and in which means is provided for securing the said second posts to said additional legs including a locking member slidably received in said second post and movable into locking relation with the respective additional leg.

7. A transfer device for sheet materials as claimed in claim 1, including a retaining member carried by each of said movable sections and having an inclined face substantially parallel with the inclined section of said support wall when the support wall and movable sections are in sheet retaining position.

8. A transfer device for sheet materials as claimed in claim 1, in which the frame supporting means comprises a plurality of legs arranged at the corners thereof, a caster assembly including a bracket secured to each leg, a caster carried by said bracket, and a spring for resiliently urging each caster downwardly, the combined force of the several springs being greater than the weight of the frame to lift the same relative to the casters when the frame is empty, whereas when sheet material is stacked on the frame the combined weight of the frame and sheet material will compress the springs to lower the frame so that it rests upon said corner legs.

9. A transfer device for sheet materials as claimed in claim 2, in which the frame supporting means includes a plurality of tubular legs arranged at the corners thereof, each tubular leg being provided at its lower end with a frusto-conical foot and being open at its upper end, the frusto-conical feet on the legs of a second transfer device, when stacked upon the first transfer device, being received within the open upper ends of the tubular legs of said first transfer device when the support wall of the first transfer device is in lowered position and the movable sections thereof are moved from sheet retaining position.

10. A transfer device for sheet materials as claimed in claim 2, in which the support wall is provided with end posts aligned with and supported upon the upper ends of certain of the legs of the transfer device when the support wall is in sheet receiving position, in which the pair of movable sections each comprises at least one end post aligned with and supported upon the upper ends of other of said legs when said movable sections are in sheet retaining position, each of said legs being provided at its lower end with a frusto-conical foot and the upper end of each of said posts being provided with a nesting cup member for receiving therein the frusto-conical feet of a second transfer device when stacked upon a first transfer device.

References Cited in the file of this patent

UNITED STATES PATENTS

| | | |
|---|---|---|
| 1,065,272 | Price | June 17, 1913 |
| 2,559,856 | Edhlund | July 10, 1951 |
| 2,661,988 | Steene | Dec. 8, 1953 |
| 2,863,566 | White | Dec. 9, 1958 |
| 2,894,641 | Edwards | July 14, 1959 |

FOREIGN PATENTS

| | | |
|---|---|---|
| 624,830 | France | Apr. 12, 1927 |